Figure 1:
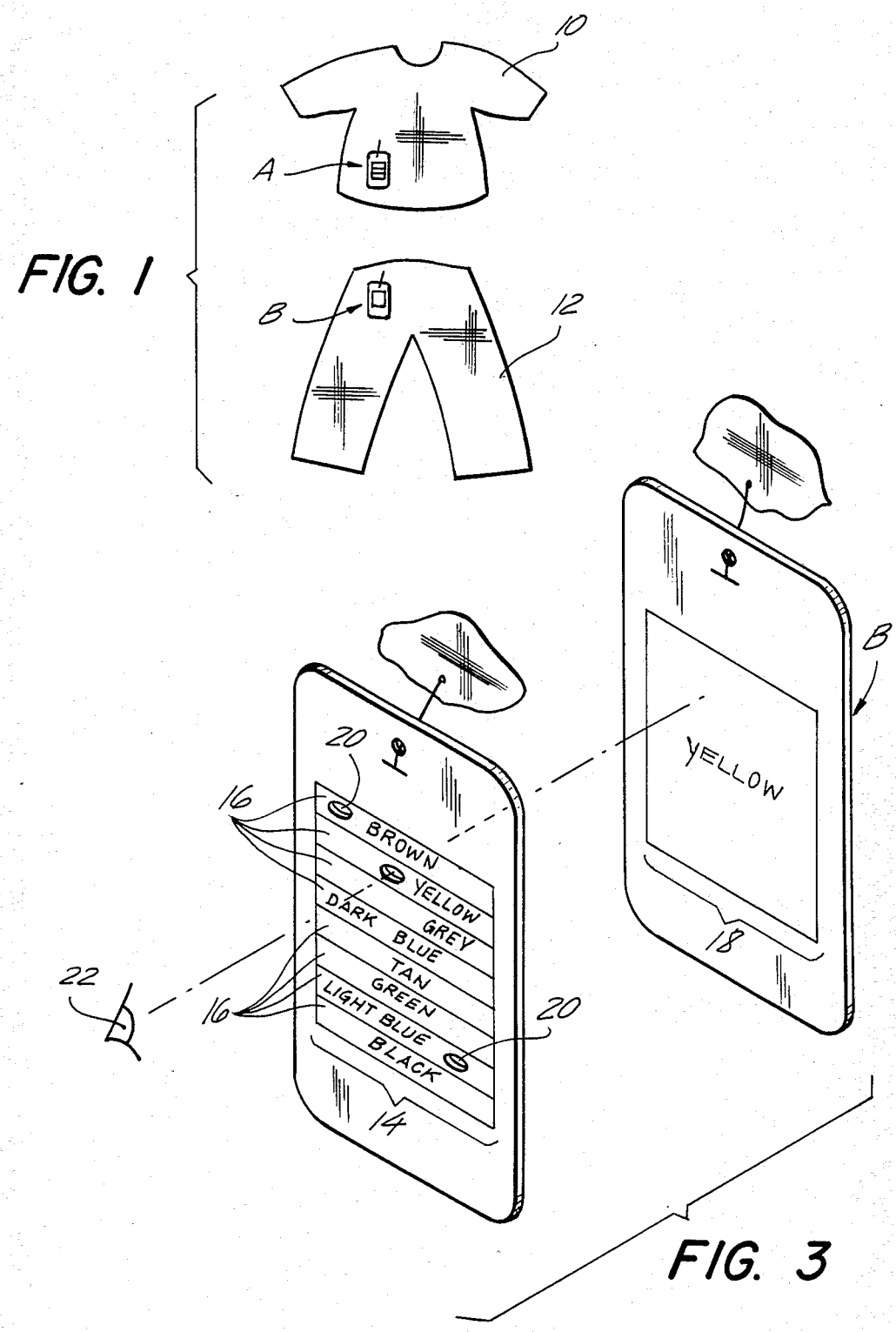

United States Patent [19]

Noto et al.

[11] Patent Number: 4,514,178
[45] Date of Patent: Apr. 30, 1985

[54] METHOD AND APPARATUS FOR COORDINATION OF GARMENTS

[75] Inventors: Peter Noto, Staten Island; Michael Reid, New York, both of N.Y.

[73] Assignee: Garan, Inc., New York, N.Y.

[21] Appl. No.: 551,112

[22] Filed: Jan. 31, 1984

Related U.S. Application Data

[63] Continuation of Ser. No. 366,178, Apr. 7, 1982, abandoned.

[51] Int. Cl.³ .............................................. G09B 25/00
[52] U.S. Cl. ................................................... 434/395
[58] Field of Search ............... 2/246; 434/98, 99, 100, 434/395, 396, 397, 398, 399, 400

[56] References Cited

U.S. PATENT DOCUMENTS

| | | | |
|---|---|---|---|
| 1,718,919 | 6/1929 | Fitzgibbon | 434/99 X |
| 1,741,080 | 12/1929 | Stenz | 434/100 |
| 2,297,282 | 9/1942 | Belden | 434/99 |
| 2,354,493 | 7/1944 | Adams | 434/98 |
| 2,499,450 | 3/1950 | Bergman | 434/99 |
| 3,395,470 | 8/1968 | Voice | 434/395 X |

OTHER PUBLICATIONS

Wembley Color Guide, pp. 10, 11 of Men's Wear vol. 132, No. 11, Jan. 13, 1956 434-99.

Primary Examiner—Harland S. Skogquist
Attorney, Agent, or Firm—James & Franklin

[57] ABSTRACT

Garments of one generic type, e.g. bottoms, are each provided with a first type of hangtag having a single color thereon. In most instances, the color is selected from a predetermined universe of colors. Each garment of the second generic type, e.g. tops, is provided with a second type of hangtag with all of the colors in the universe thereon. One or more of the colors on the first type of hangtag are designated by punching the area thereon bearing that color. Any bottom having a tag with a color corresponding to one of the designated colors, coordinates with the top bearing the punched tag. The color of the tag of the first type is visible through the punch in the tag of the second type, when same are held in registration, one behind the other. Bottoms having tags with a color other than one selected from the universe, coordinate with all tops.

11 Claims, 3 Drawing Figures

METHOD AND APPARATUS FOR COORDINATION OF GARMENTS

This is a continuation of U.S. application Ser. No. 366,178 filed Apr. 7, 1982, now abandoned.

The present invention relates to a method and apparatus for coordinating members selected from different sets of generically different types of wearing apparel.

A substantial amount of clothing, particularly children's clothing, is available in the form of coordinated sets, for example, coordinated tops (e.g. shirts or sweaters) and bottoms (e.g. slacks or shorts), or coordinated three-piece outfits which may include shirts, slacks and vests. These garments are generally coordinated on the basis of color and pattern or design.

Children and certain adults frequently encounter difficulty in selecting the appropriate coordinating garments to form a set, either as a result of their inexperience concerning minor differences in color, patterns or designs, or due to a physical disability such as color blindness, which may make it difficult to distinguish variations in color, pattern and design. As a result, uncoordinated garments may be used together in an aesthetically unpleasing manner. This may discourage unsupervised clothing selection.

One attempt to ovecome such difficulties is described in U.S. Pat. No. 3,775,775, entitled "Design Coding For Coordinated Garment Sets", issued to Anthony Mazzenga on Dec. 4, 1973, and owned by the assignee herein. That patent describes a simple method of forming coordinated sets of wearing apparel. Identifying indicia, in the form of pictorial representations of fanciful animals, are applied to each garment. Each garment in a set is provided with the same pictorial representation as the other garment in the set. Because of this one-to-one relationship, one can select the garments in a coordinated set by simply choosing garments having the same pictorial representations thereon.

The method described in the Mazzenga patent has worked extremely well because of its simplicity and eye appeal, particularly to children. However, it has two major disadvantages.

One disadvantage relates to the fact that there is no provision for multiple matching. No more than one member from one generic set of garments can be matched with a member from the other generic set of garments. In the method described in the Mazzenga patent, identical indicia are provided for the members of each coordinated set such that, for example, only white tops and white bottoms have the same indicia, only gray tops and gray bottoms have the same indicia, and only blue tops and blue bottoms have the same indicia. White tops can never properly be coordinated with blue or gray bottoms.

However, it may be desirable to have a white top coordinate with gray or blue bottoms, in addition to white bottoms; or a gray top coordinate with a white or blue bottom, as well as a gray bottom; or blue top coordinate with white or gray, as well as blue bottoms. Moreover, there is no indicia which indicates one member of a particular generic set can coordinate with all members of the other generic set, even though it may be desirable to have each of the white, gray and blue tops match with a black bottom. As a consequence, the Mazzenga system, while elegant in its simplicity, is limited in its application.

The other drawback of the Mazzenga system relates to the fact that a distinctly different identifying indicia is required for each coordinated set. Since there may be many different coordinated sets, many different distinctly different identifying indicia are required. Accordingly, the expenses involved in preparing, printing, inventorying and attaching hangtags bearing the many different identifying indicia are considerable.

It is, therefore, a primary object of the present invention to provide a method and apparatus for the coordination of garments which provides for the coordination of multiple members of one generic type of garment with a single member of the other generic type of garment.

It is a further object of the present invention to provide method and apparatus for the coordination of garments which reduces the required number of different indicia bearing devices.

It is still a further object of the present invention to provide method and apparatus for the coordination of garments, wherein a member of one garment set may coordinate with all of the members of the other garment set.

It is still a further object of the present invention to provide method and apparatus for the coordination of garments which is simple enough to enable even young children to readily determine the coordinating garments.

It is still a further object of the present invention to provide method and apparatus for the coordination of matching garments wherein the indicia carrying devices are decorative, attractive and simple in design.

In accordance with the present invention, a method and apparatus for the coordination of members of a first set of garments is provided. First and second sets of indicia bearing devices are utilized. A different one of the devices from the first set of devices is associated with each of the members of the first garment set. A different one of the devices from the second set of devices is associated with each of the members of the second garment set. Each of the devices of the first set of devices bears a single indicia thereon, selected from a universe consisting of multiple indicia. Each of the devices of the second set bears each of the indicia in the universe. Means, associated with each of the devices of the second set of devices, is provided for designating selected ones of the indicia thereon. The designated indicia correspond to a subset of devices of the first set of devices which bear indicia identical to the designated indicia. Each of the members of the first garment set associated with the devices in the designated subset coordinate with the member in the second garment set associated with the device bearing the designated indicia.

The designating means comprises light transmissive portions on the device of the second set of devices within the areas thereon encompassed by the selected indicia. The indicia on a device from the first set of devices can be detected through the light transmissive portion on the device from the second set of devices when the devices are in registration.

The indicia preferably comprise colors, and more particularly colored areas on the devices. The universe of multiple indicia therefore comprises a plurality of different colored areas.

The indicia on each of the devices of the first set of devices covers a given area of the surface thereof. All of the indicia on the devices of the second set of devices also cover a given area thereof. The given areas are substantially equal.

The colored areas on the devices of the second set of devices preferably comprise a plurality of substantially parallel colored bands. The devices preferably take the form of hangtags.

The members of the first garment set are generically different from the members of the second garment set. However, the members in each garment set are generically the same as the other members in that set.

Devices of a third set of devices bear a single indicia not selected from the universe. The members of the first set of garments which are associated with the devices from the third set of devices coordinate with all of the members of the second set of garments.

More specifically, the present invention relates to a method and apparatus for the coordination of members from first and second sets of generically different garments. The invention comprises a first type of tag, a different one of which is affixed to each of the members of the first garment set, and a second type of tag, a different one of each being affixed to each of the members of the second garment set. Each of the tags of the first type bear a single color selected from a group of colors. Each of the tags of the second type bear all of the colors in the group. Means are provided for designating one or more of the colors on the tag of the second type. The designated colors correspond to a set of tags of the first type associated with the designated colors. Each of the members of the first garment set associated with a tag of the first type in the defined set coordinate with the member in the second garment set associated with the tag of the second type having the designated colors thereon.

Preferably, the means for designating a particular color on a tag of the second type is to cut or punch out a portion of the surface of the tag covered by the designated color. The color of the tag of the first type can be viewed through the cut-out portion of the tag of the second type when the tags are held in registration.

Tags of a third type each bear a color not selected from the group. The members of the first garment set associated with these third type tags coordinate with all members of the second garment set.

Figure 2:
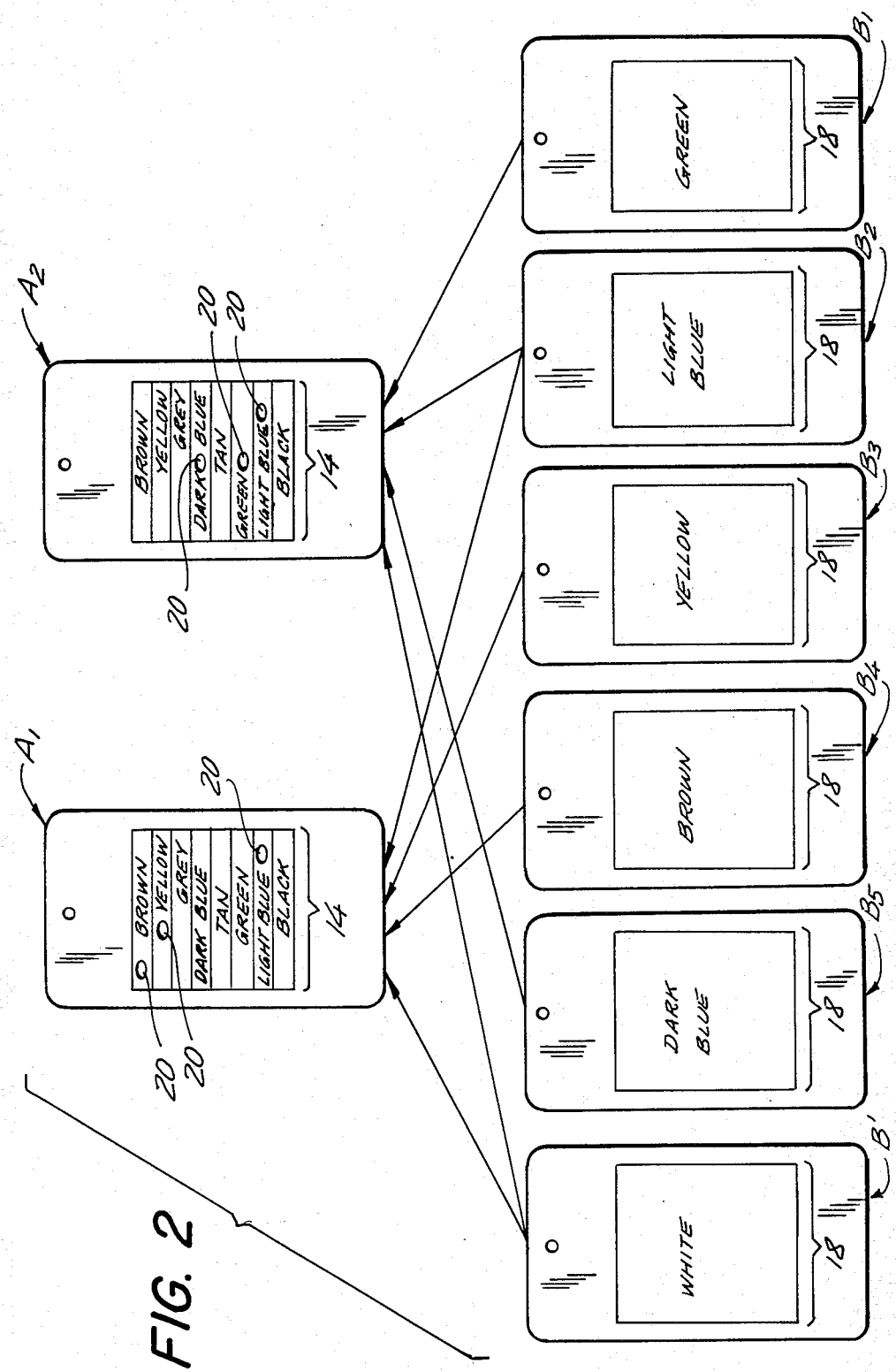

To the accomplishment of the above, and to such other objects which may hereinafter appear, the present invention relates to method and apparatus for the coordination of matching membes of garment sets, as described in detail in the following specification and defined in the annexed claims, taken together with the accompanying drawings, wherein like numerals refer to like parts and in which:

FIG. 1 is a front plan view of a typical coordinated set of garments with indicia bearing devices affixed thereto;

FIG. 2 is a plan view of first and second sets of indicia bearing devices showing the different ways in which the garments affixed thereto may be matched; and FIG. 3 is an exploded isometric view of a device from each of the first and second sets of indicia bearing devices, illustrating the manner in which the indicia on the device of the first set may be viewed through the device of the second set and, particularly, areas with the designated indicia.

The types of garments which can be used in conjunction with the present invention include a wide variety of different wearing apparel. In each case, the coordinated garments are selected from at least two generically different sets of wearing apparel. For example, one generic set may include tops, that is, shirts, blouses, and sweaters, whereas another generic set, with which the members of the first set are coordinated, might be bottoms, including slacks, shorts, and skirts. In another example, one generic set could include pajama tops, and a second generic set include pajama bottoms.

The garments may be coordinated solely on the basis of color or on the basis of combined color and pattern or design. Thus, a coordinated pair of red garments is indicative of a color coordinated set, while a coordinated pair of white and green vertically striped garments is indicative of a color and design coordinated set. However, a set of garments coordinated on the basis of color need not be of the same color. Thus, a light blue shirt may coordinate with dark blue slacks, or a green shirt may coordinate with white and green vertically striped slacks. Thus, color coordination may also consist of a solid color garment combined with the appropriately matching multi-colored garment.

It is also important to understand that, in many cases, multiple garments from one generic set may coordinate with a single garment from a second generic set. For example, either a white shirt or a green shirt may coordinate with white and green striped slacks. Moreover, certain garments from the first generic set may match with all of the garments in the second generic set. Thus, for example, a white shirt may match with slacks of virtually any color.

The identifying indicia which are applied to the devices may be selected from a virtually unlimited number of different types of indicia. The present invention is described herein through the use of indicia which are colors. However, numbers, pictures, geometric shapes, or other types of indicia could be used in a similar manner, and the present invention should not be construed as being limited to the use of colors as indicia.

Likewise, the particular type of device which carries the indicia and the manner in which same is associated with the garment are described herein, for purposes of illustration, as a hangtag which is affixed to a garment by a string or plastic fastener attachment. However, other types of devices, for example, appliques, woven labels, or even a portion of the garment itself, may serve as the indicia bearing device and any appropriate manner of association can be used. Therefore, the present invention should not be construed as being limited to the use of hangtags affixed to the garments by means of string or plastic fasteners.

It is preferred that the indicia utilized be decorative and attractive. It is also preferred that the indicia be simple and distinct so as to facilitate recognition.

FIG. 1 illustrates a pair of coordinated garments, each of which is selected from a different one of two generically different garment sets. A garment from one generic garment set, for example, a top 10 (such as a shirt, blouse, sweater, vest or the like) is coordinated with a garment from the second generic set, for example, a bottom 12 (such as slacks, shorts, a skirt or the like). The coordination may be on the basis of color, design, or pattern; any combination thereof, or on any other basis.

Each of the garments 10 and 12 has associated therewith an indicia bearing device which, in the preferred embodiment, is a hangtag, generally designated A and B, respectively. The indicia bearing device may be associated with the garment in any appropriate manner. In the preferred embodiment, hangtags A and B are affixed to the respective garments by means of a string or a plastic attachment of the type commonly used for this purpose.

The indicia used in the preferred embodiment for coordinating purposes are colors. For purposes of illustration, the colors brown, yellow, gray, dark blue, tan, green, light blue and black have been arbitrarily selected to make up a universe of colors. It should be understood that any colors can function equally as well as the colors selected and that the invention should not be construed as limited to the particular colors depicted on the drawings. However, it is preferable to select colors which are as readily distinguishable from each other as is possible.

Hangtags A and B are of different types. Each hangtag of type A is provided with an indicia bearing area 14, divided into eight substantially parallel strips or bands 16. Each of the bands 16 is of a different color, selected from the universe. Thus the top band 16 is brown, the second yellow, the third gray, etc. The shape and size of the area 14 and the shape and size of the bands 16 are not critical to the invention. Vertical bands instead of horizontal bands, or square bands instead of rectangular bands, etc. would work as well. All that is required is that the colored areas be large enough to be easily seen.

Tags of the B type also have an indicia carrying area 18. Area 18 is preferably of the same dimensions as the dimensions of area 14 on tag A and is preferably located on the surface of tag B at the same location as area 14 is on the surface of tag A. Area 18 on tag B in only a single color. As shown in FIG. 3, area 18 is yellow. The color which appears on tag B may be selected from the universe of colors which appears on tag A, is illustrated in FIG. 3, or may have a color which is not selected from the universe of colors which appear on tag A. This latter case is a specialized situation in which any garment bearing a type B tag will coordinate with all garments bearing a type A tag. For purposes of illustration, let us assume, for the moment, that all tags B bear a color selected from the universe of colors which appears on tag A.

Let us assume that a particular top will coordinate with three different bottoms. The top has affixed thereto a tag A, as illustrated in FIG. 3. Let us further assume that each of the bottoms is associated with a different one of the tags B. The colors on these tags B are brown, yellow and light blue, respectively. One of these tags B, carrying the yellow color, is illustrated in FIG. 3.

Several of the color bands 16 on the tag A are selected in accordance with the colors on the three tags B associated with the bottoms which will coordinate with the top bearing the tag A. Thus, in this example, the brown, yellow and light blue color bands 16 on tag A are selected. The selected color bands on tag A are designated by providing a light transmissive portion 20 within each of the selected bands. Preferably, light transmissive portions 20 are punched or cut-out portions of the tag. The light transmissive portions 20 may be of any shape and size, but should be large enough to be easily visible.

The light transmissive portions 20 can also be used in an additional manner, as is illustrated in FIG. 3. If the indicia bearing portions 14 and 18 of tags A and B are held in registration, with tag A in front of tag B, a user, whose eye 22 is illustrated, can look through the light transmissive portions 20 on tag A and observe the color of area 18 on tag B. In this manner, the proper matching of the indicia on the respective tags is facilitated because the color observed through the light transmissive portion 20 will be observed as adjacent to the color of the band in which the light transmissive portion 20 is situated. Thus, a side-by-side comparison of the colors can be easily made. This feature is of importance in situations where an individual has some physical defect which makes it difficult to distinguish between different colors, unless a side-by-side comparison is made. By matching colors in the side-by-side fashion, it is possible for such a person to match equal shades without being able to distinguish between the different colors.

FIG. 2 illustrates the multiple coordinating capabilities of the present invention, as well as the manner in which the required number of different tags is reduced by the present invention. Two identical tags $A_1$ and $A_2$ are shown, each of which has eight color bands representing the eight colors in the universe, namely, brown, yellow, gray, dark blue, tan, green, light blue and black. All of the type A tags are identical and, therefore, only a single version of tag A need be printed. Tag $A_1$ has the colors brown, yellow and light blue designated by having light transmissive portions 20 within the brown, yellow and light blue bands 16, respectively. On tag $A_2$, dark blue, green and light blue have been designated and light transmissive portions 20 are situated in these bands.

Five different type B tags are illustrated as $B_1$, $B_2$, $B_3$, $B_4$, and $B_5$, and a single B' tag is shown. Tag $B_1$ is green. Tag $B_2$ is light blue. Tag $B_3$ is yellow. Tag $B_4$ is brown. Tag $B_5$ is dark blue. Tag B' is white. A garment, such as a pair of slacks, bearing tag $B_1$ will coordinate with any garment, for example a shirt, having a tag A thereon with green as a designated color. Such a tag is tag $A_2$, but not tag $A_1$. A garment to which tag $B_2$ is attached will coordinate with a garment to which tag $A_1$ is attached or a garment to which tag $A_2$ is attached, because light blue is a designated color for both tags $A_1$ and $A_2$. A garment bearing tag $B_3$ will coordinate only with a garment to which tag $A_1$ is attached because the color of tag $B_3$ is yellow and yellow is a designated color only on tag $A_1$ and not on tag $A_2$. A garment bearing tag $B_4$ will coordinate with any garment bearing a tag A which has brown as a designated color, in this case tag $A_1$, but not tag $A_2$. A garment to which tag $B_5$ is attached will coordinate with any garment bearing a tag A which has dark blue as a designated color, in this instance, tag $A_2$, but not tag $A_1$.

Tags $B_1$ through $B_5$ all bear colors selected from the universe of colors which appear on tags A. However, tag B' has a color, in this example white, which is not selected from the universe of colors and, therefore, does not have a counterpart on any of the tags A. A tag B' having a color not selected from the universe will coordinate with any garment which bears any tag A. Thus, a garment bearing tag B' will coordinate with a garment bearing tag $A_1$ or tag $A_2$.

It will now be appreciated that the present invention relates to a method and apparatus for the coordination of garments which provides for the coordination of multiple members of one generic type of garment with a single member of another type of garment. The present invention reduces the number of different indicia bearing devices required because all of the garments of one generic set are provided with identical tags, which are thereafter altered to designate the selected indicia. In addition, a member of one generic garment set may coordinate with all of the members of the other generic garment set by having a tag with a color that has no counterpart on the tags of the garments of the other generic set.

The system is simple enough such that even young children can readily determine the coordinating garments. Further, the indicia carrying devices are decorative, attractive and simple in design.

While only a single preferred embodiment of the present invention has been described herein for purposes of illustration, it is obvious that many modifications and variations could be made thereto. It is intended to cover all of these variations and modifications which fall within the scope of the present invention, as defined by the following claims:

We claim:

1. Apparatus for coordination of one or more members of a first set of garments with one or more members of a second set of garments by the visual characteristics thereof, each of the garment sets comprising a plurality of members, at least some of which have different visual characteristics from others, said apparatus comprising first and second sets of marking bearing devices, a different one of the devices in said first device set being associated with each member of the first garment set, a different one of the devices in said second device set being associated with each member of the second garment set, each of said devices in said first device set bearing a single marking from a set of markings comprising a plurality of different markings, all of said devices in said second device set bearing each of said markings in said marking set, and means, associated with each of said devices in said second device set, for designating one or more of said markings thereon, said designated markings corresponding to a subset of said devices in said second device set which bear the same marking as the designated marking, each of the members of the first garment set associated with a device in said subset of devices coordinating with the member in said second garment set associated with the device of said second device set bearing said designated marking.

2. The apparatus according to claim 1, wherein said markings comprise color markings.

3. The apparatus of claim 1, wherein said devices are tags.

4. The apparatus of claim 3, wherein said tags are hangtags.

5. The apparatus of claim 1, wherein said designating means comprises a light transmissive portion.

6. The apparatus of claim 5, wherein said markings on said devices of said first device set can be observed through said light transmissive portion when said device of said first set is held in registration with the markings on said device in said second set of devices.

7. The apparatus of claim 1, further comprising devices of a third set of devices which bear a single marking not selected from said indicia set.

8. The apparatus of claim 7, wherein the members of the first set of garments associated with said devices of said third set of devices coordinate with any members of the second set of garments.

9. A method for coordination of one or more members of a first set of garments with one or more members of a second set of garments by the visual characteristics thereof, each of the garment sets comprising a plurality of members, at least some of which have diferent visual characteristics than others, including first and second sets of marking bearing devices, said method comprising the following steps:
(a) associating a different one of the devices in the first device set with each member of the first garment set;
(b) associating a different one of the devices in the second device set with each member of the second garment set;
(c) providing each of the devices in the first device set with a single marking selected from a set of markings comprising a plurality of different markings;
(d) providing all of the devices in the second device set with each marking in the marking set;
(e) designating one or more of the markings on each of the devices in the second set of devices;
(f) defining a subset of devices in the first device set which bear markings which are the same as the designated marking; and
(g) coordinating each of the members of the first garment set associated with a device in the second set of devices with the member in the second garment set associated with the device of the second device set bearing the designated marking.

10. The method of claim 9 wherein the markings comprise color markings.

11. The method of claim 9, further comprising devices of a third set of devices and wherein the method further comprises the step of associating a garment from the first garment set with a device of the third set of devices and coordinating the garment associated with the device of the third set of devices with any garment from the second set of garments.

* * * * *